United States Patent
Jeong et al.

(10) Patent No.: US 9,499,217 B2
(45) Date of Patent: Nov. 22, 2016

(54) VARIABLES SPOILER APPARATUS FOR VEHICLE

(71) Applicants: Hyundai Motor Company, Seoul (KR); Kia Motors Corp., Seoul (KR)

(72) Inventors: Phil Jung Jeong, Yongin-si (KR); Hyun Gyung Kim, Hwaseong-si (KR); Young Sub Oh, Suwon-si (KR); Dong Eun Cha, Suwon-si (KR); Bock Cheol Lee, Suwon-si (KR); Seung Mok Lee, Osan-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/562,483

(22) Filed: Dec. 5, 2014

(65) Prior Publication Data

US 2016/0046334 A1   Feb. 18, 2016

(30) Foreign Application Priority Data

Aug. 18, 2014 (KR) .......................... 10-2014-0106950

(51) Int. Cl.
*B62D 35/00* (2006.01)
*F16H 37/14* (2006.01)

(52) U.S. Cl.
CPC .............. *B62D 35/007* (2013.01); *F16H 37/14* (2013.01)

(58) Field of Classification Search
CPC .............................. B62D 35/007; F16H 37/14
USPC ............................................. 296/180.1, 180.5
See application file for complete search history.

(56) References Cited

U.S. PATENT DOCUMENTS

| | | | |
|---|---|---|---|
| 7,063,375 B2 * | 6/2006 | Dringenberg | B62D 35/007 296/180.5 |
| 8,177,288 B2 | 5/2012 | Molnar et al. | |
| 2004/0256885 A1 | 12/2004 | Bui | |

FOREIGN PATENT DOCUMENTS

| | | |
|---|---|---|
| JP | 1-195117 A | 8/1989 |
| JP | 7-2148 A | 1/1995 |
| JP | 2008-87550 A | 4/2008 |
| KR | 10-1316203 B1 | 10/2013 |

* cited by examiner

*Primary Examiner* — Joseph D Pape
*Assistant Examiner* — Dana Ivey
(74) *Attorney, Agent, or Firm* — Morgan, Lewis & Bockius LLP

(57) ABSTRACT

A variable spoiler apparatus for a vehicle may include a driving portion including a gear set configured to provide a predetermined speed reduction ratio, wherein a driving motor and a driving shaft for supplying rotational force of the driving motor may be connected to the gear set, and a linkage, wherein a base bracket to which the driving shaft of the driving portion may be connected may be provided on the linkage, wherein the linkage includes a plurality of links that may be connected to a spoiler bracket connected to the driving shaft, the base bracket and a spoiler, and wherein the plurality of links may be rotated together with the driving shaft when the driving motor of the driving portion operates thereby to draw out or stow the spoiler such that angle and height of the spoiler may be varied.

10 Claims, 4 Drawing Sheets

VARIABLES SPOILER APPARATUS FOR VEHICLE

CROSS-REFERENCE(S) TO RELATED APPLICATION

The present application claims priority of Korean Patent Application Number 10-2014-0106950 filed on Aug. 18, 2014, the entire contents of which application are incorporated herein for all purposes by this reference.

BACKGROUND OF THE INVENTION

Field of the Invention

The present invention relates to a variable spoiler apparatus for a vehicle which is drawn out and stowed in a vehicle in accordance with a vehicle speed.

Description of Related Art

Generally, a grip of a rear tire becomes weak when a vehicle drives at a high speed or rotates and thus it is disadvantageous to increase a driving speed and deteriorates a driving stability.

In order to solve the above drawbacks an air spoiler is arranged on a rear of a vehicle to vary flow of air passing through the vehicle such that pressure for pressing down the vehicle is produced according to air flow around the air spoiler thereby to improve the grip of a rear tire.

In general, the air spoiler is arranged on a rear of a vehicle thereby to define freedom degree of designing the vehicle, and further it is difficult to vary the design of the air spoiler once it is installed. Additionally, when the air spoiler is arranged on an elegant vehicle, the design thereof is deteriorated by the arrangement of the air spoiler.

Recently, a variable spoiler is applied so as to solve the above drawbacks such that the spoiler is drawn out of a rear trunk of a vehicle when it is necessary and the spoiler is stowed therein when it is unnecessary.

However, in a case of only a configuration where a spoiler is drawn out of a rear trunk or stowed therein, there occurs a limitation to ensure effectively a driving performance of a vehicle according to a driving speed of a vehicle since it is classified only as a drawing out state and a stowing state.

Further, a separate support means is applied to a spoiler so as to support loads on the spoiler due to air while a vehicle drives in a drawing out state, however, the support means does not support the spoiler that is set at various angles and heights but supports only the spoiler that is drawn out fully.

Accordingly, it needs a spoiler of which a drawing out angle and height are fixed at various locations according to a vehicle speed and at the same time which supports air load at the corresponding locations.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a variable spoiler apparatus for a vehicle, including a driving portion including a gear set configured to provide a predetermined speed reduction ratio, wherein a driving motor and a driving shaft for supplying rotational force of the driving motor are connected to the gear set, and a linkage, wherein a base bracket to which the driving shaft of the driving portion is connected is provided on the linkage, wherein the linkage may include a plurality of links that are connected to a spoiler bracket connected to the driving shaft, the base bracket and a spoiler, and wherein the plurality of links are rotated together with the driving shaft when the driving motor of the driving portion operates thereby to draw out or stow the spoiler such that angle and height of the spoiler are varied.

A worm gear is formed on a motor shaft on the driving motor of the driving portion and the gear set is provided with a plurality of gear members having different sizes that are connected each other, and one gear member is engaged with the worm gear and another gear member is connected to the driving shaft.

The gear set of the driving portion may include a gear housing, an input gear member that is arranged rotatably in the gear housing and is engaged with a worm gear, a middle gear member that is engaged with the input gear member to be rotated in an opposing direction of the input gear member, and an output gear member which is engaged with the middle gear member and to a center of which the driving shaft is connected integrally.

The input gear member, the middle gear member and the output gear member of the gear set may have different gear ratios respectively to set reduction ratio and respective gear ratio is set to support load applied to the spoiler.

The motor shaft of the driving motor is extended front/rearward to rotate front/rearward the gear member of the gear set that is engaged with the worm gear.

The linkage may include a first link member, one end of which is connected integrally to a front end of the base bracket through the driving shaft and which is rotated together with the driving shaft, a second link member, one end of which is connected rotatably to another end of the first link member and another end of which is connected to the spoiler bracket, and a third link member, one end of which is connected rotatably to a rear end of the base bracket and another end of which is connected rotatably to the second link member.

The first link member, the second link member and the third link member of the linkage are provided as a pair symmetrical to both sides of the base bracket and the spoiler bracket.

A fixing protrusion is formed on the third link member, which contacts the second link member and defines a rotation of the third link member when the spoiler is drawn out fully.

In a state where the spoiler is drawn out fully, the another end of the third link member connected to the second link member is disposed to be higher than the one end of the second link member connected to the first link member.

The third link member is formed to be maintained approximately at right angle to the base bracket when the spoiler is drawn out fully.

The linkage is formed such that the base bracket, the first link member, the second link member and the third link member are connected to be unfolded to form a trapezoid or quadrangle when the spoiler is drawn out fully In a state where the spoiler is drawn out fully, the other end of the third link member connected to the second link member may be disposed to be higher than one end of the second link member connected to the first link member.

The third link member may be formed to be maintained at almost right angle to the base bracket when the spoiler is drawn out fully.

The linkage may be formed such that the base bracket, the first link member, the second link member and the third link member are connected to be unfolded to form a trapezoid or quadrangle when the spoiler is drawn out fully.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
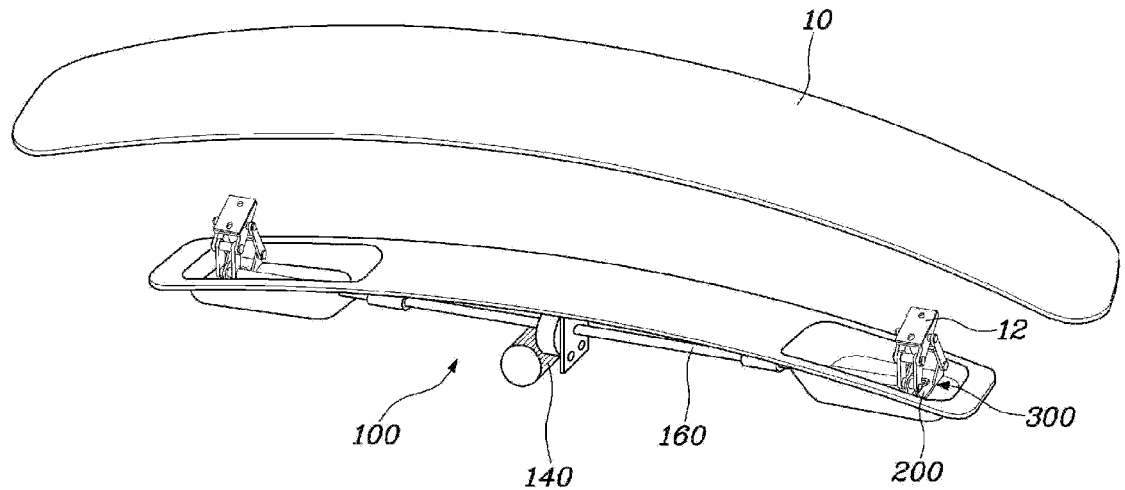
FIG. 1 is a view illustrating a variable spoiler apparatus for a vehicle according to an exemplary embodiment of the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, a variable spoiler apparatus for a vehicle according to an exemplary embodiment of the present invention is described with reference to the accompanying drawings.

Figure 2:
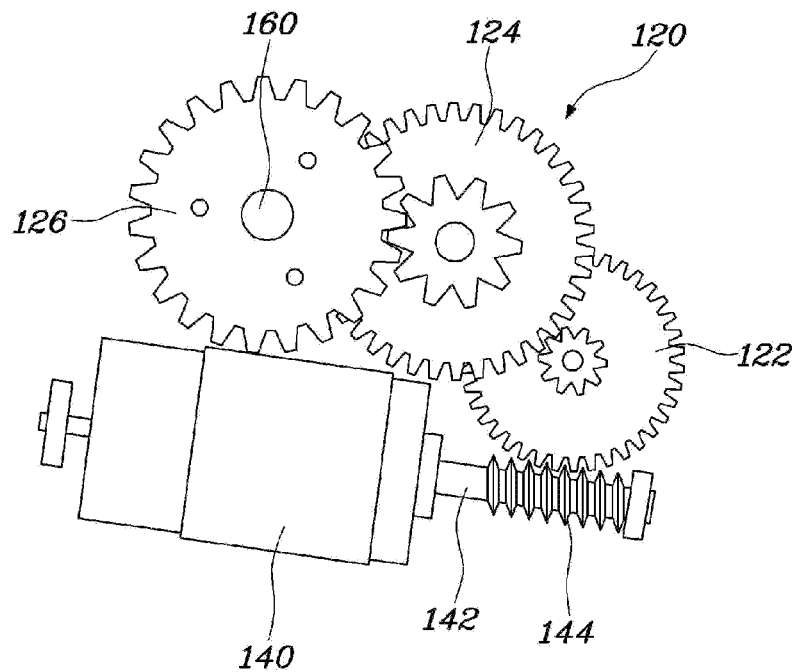
FIG. 2 and FIG. 3 are views illustrating a driving portion of the variable spoiler apparatus for a vehicle as shown in FIG. 1.
Figure 3:
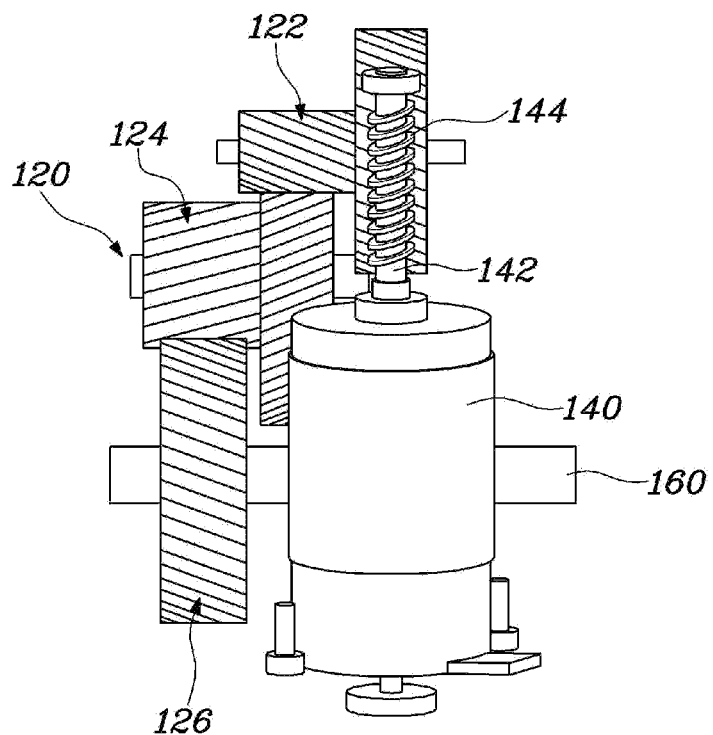
Figure 4:
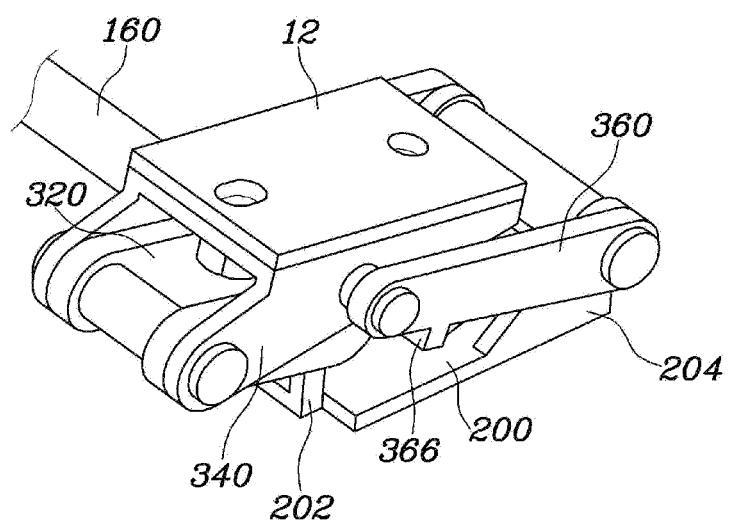
FIG. 4 and FIG. 5 are views illustrating a linkage of the variable spoiler apparatus for a vehicle as shown in FIG. 1.
Figure 5:
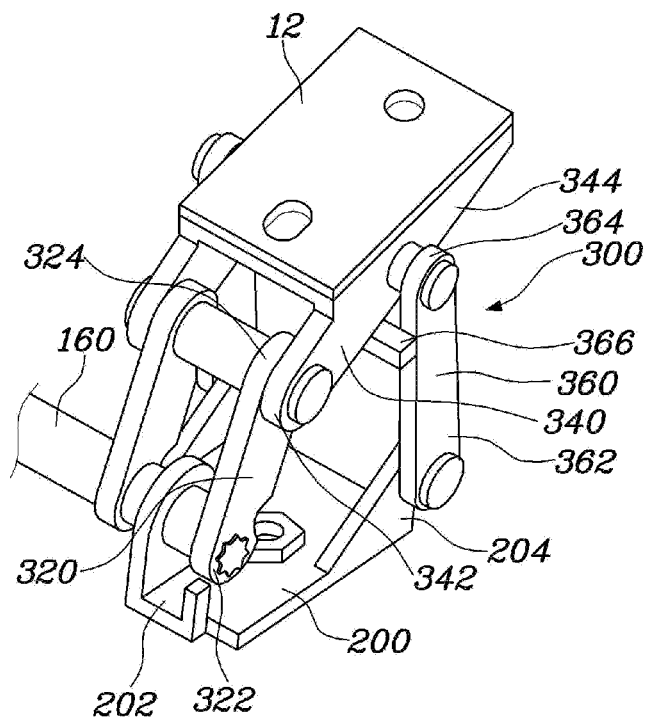

FIG. 1 is a view illustrating a variable spoiler apparatus for a vehicle according to an exemplary embodiment of the present invention, FIGS. 2 and 3 are views illustrating a driving portion of the variable spoiler apparatus for a vehicle as shown in FIG. 1, FIGS. 4 and 5 are views illustrating a linkage of the variable spoiler apparatus for a vehicle as shown in FIG. 1, and FIGS. 6 to 8 are views illustrating an operation state of the linkage of the variable spoiler apparatus for a vehicle as shown in FIG. 1.

A variable spoiler apparatus for a vehicle according to an exemplary embodiment of the present invention includes: a driving portion 100 configured such that a gear set 120 having a predetermined speed reduction ratio is provided, to which a driving motor 140 and a driving shaft 160 for supplying rotational force of the driving motor 140 are connected, and a linkage 300 on which a base bracket 200 to which the driving shaft 160 of the driving portion 100 is connected is provided and a plurality of links that are connected to a spoiler bracket 12 connected to the driving shaft 160, the base bracket 200 and a spoiler 10 are provided wherein the plurality of links are rotated together with the driving shaft 160 when the driving motor 140 of the driving portion 100 operates thereby to draw out or stow the spoiler such that angle and height of the spoiler are varied.

The driving portion 100 serves to not only provide simply power required for stowing or drawing out the spoiler 10 but also to support the spoiler 10 at a location where the spoiler 10 is drawn out at a proper height and angle by applying a predetermined reduction ratio of the gear set 120, even though air load is applied. That is, according to an exemplary embodiment of the present invention air load applied on the spoiler 10 is supported by the gear set 120 regardless of a drawing out angle of the spoiler 10 when the spoiler 10 is drawn out, even though power from a driving motor 140 is not applied thereto.

A linkage 300 is provided to be rotated by receiving power from the driving portion 100, allowing the spoiler 10 to be drawn out or stowed.

A base bracket 200 to which the driving shaft 160 of the driving portion 100 is connected is provided on the linkage 300 and the linkage is rotated by receiving power through the driving shaft 160 when a driving motor 140 of the driving portion is operated and thus angle and height thereof are varied simultaneously to vary angle and height of the spoiler 10. As a result, a stowing or drawing out of the spoiler 10 is to be performed.

The base bracket 200 provided on the linkage 300 is fixed to a vehicle body panel to fix the location of the spoiler 10 to be connected to the linkage 300 and supports the spoiler 10. According to an exemplary embodiment of the present invention the linkage 300 is mounted to the vehicle body panel through the base bracket 200 and further the linkage may be mounted directly to the vehicle body panel or mounted through other elements of a vehicle body in addition to the base bracket 200.

In more detail, as shown in FIGS. 2 and 3, a worm gear 144 is formed on a motor shaft 142 on a driving motor 140 of the driving portion 100 and the gear set 120 is provided with a plurality of gear members having different sizes that are connected each other wherein one gear member is engaged with the worm gear 144 and another gear member is connected to the driving shaft 160.

Here, the driving motor 140 of the driving portion 100 uses a motor that can be rotated and reversely rotated and thus the operation of the drawing out and stowing the spoiler 10 can be implemented by rotation and reverse rotation of the driving motor 140.

Further, the motor shaft 142 of the driving motor 140 is extended front/rearward to rotate front/rearward the gear member of the gear set 120 that is engaged with the worm gear 144. That is, as the gear member is rotated front/rearward, the driving shaft 160 that is connected to an output gear member, which will be described later, is rotated front/rearward, and the linkage 300 is rotated to the rotation direction of the driving shaft 160 thereby to control the angle thereof to implement the operations of drawing out or stowing the spoiler 10.

The motor shaft 142 is extended from the driving motor 140, the worm gear 144 is formed on the motor shaft 142, the gear set 120 is formed by connecting a plurality of gear members having different sizes, and the worm gear 144 and the driving shaft 160 are connected to the gear members such that the operational force of the driving motor 140 is transferred through the plurality of gear members that are connected respectively to rotate the driving shaft 160, when the driving motor 140 is operated.

In more detail, the gear set 120 of the driving portion 100 may include: a gear housing, an input gear member 122 that is arranged rotatably in the gear housing and is engaged with a worm gear 144, a middle gear member 124 that is engaged with the input gear member 122 to be rotated in an opposing direction of the input gear member 122, and an output gear member 126 which is engaged with the middle gear member 124 and to a center of which the driving shaft 160 is connected integrally.

That is, the operational force transferred from the driving motor 140 is transmitted to the worm gear 144, the input gear member 122, the middle gear member 124, and the output gear member 126 in sequence wherein when the output gear member 126 rotates, the driving shaft 160 connected integrally to a center of the output gear member 126 is rotated thereby to control angle and height of the linkage 300 connected to the base bracket 200.

Here, the input gear member 122, the middle gear member 124 and the output gear member 126 of the gear set 120 have different gear ratios respectively to set reduction ratio. That is, a plurality of gear tooth are formed along the respective surrounding of the worm gear 144, the input gear member 122, the middle gear member 124 and the output gear member 126, and the gear ratio is set according to the engaged number of gear tooth and the reduction ration of the gear set 120 is set according to the set gear ratio.

As shown in FIGS. 2 and 3, a helical gear may be applied to the worm gear 144, the input gear member 122, the middle gear member 124 and the output gear member 126 and the tooth number of the respective gear is controlled to set the gear ratio thereby to set the reduction ratio.

However, the respective gear ratio according to the engagements of the worm gear 144, the input gear member 122, the middle gear member 124 and the output gear member 126 needs to be set to support sufficiently air load applied on the spoiler 10 when a vehicle drives. According to an exemplary embodiment of the present invention, the location of the spoiler 10 needs not to be varied by air load when a vehicle drives, using the reduction ratio set on the gear set 120. Accordingly, the respective gear ratio of the worm gear 144, the input gear member 122, the middle gear member 124 and the output gear member 126 is set by calculating in advance the air load according to a driving speed through experiments and the reduction ratio of the gear set 120 is set within a range not producing a back drive phenomenon of the driving motor 140 by the air load.

As described above, a plurality of gear members provided on the gear set 120 are engaged each other and thus the air load that is applied on the air spoiler 10 when a vehicle drives is supported by using the set reduction ratio, thereby fixing the drawing out location of the spoiler 10 at various drawing out angles of the spoiler 10.

Meanwhile, as shown in FIGS. 4 and 5, the linkage 300 includes: a first link member 320 one end of which is connected integrally to a front end 202 of the bracket 200 through the driving shaft 160 and which is rotated together with the driving shaft 160, a second link member 340 one end 342 of which is connected rotatably to the other end 324 of the first link member 320 and the other end 344 of which is connected to a spoiler bracket 12, and a third link member 360 one end 362 of which is connected rotatably to a rear end 204 of the base bracket 200 and the other end 364 of which is connected rotatably to the second link member 340. The linkage 300 has a four joint structure with the first link member 320 connected to the base bracket 200, the second link member 340 and the third link member 360 wherein the first link member 320 connected to the driving shaft 160 is rotated together with the driving shaft 160 when the driving motor 140 operates, the second link member 340 connected to the first link member 320 is rotated together with the spoiler bracket 12 and the third link member 360 to support the spoiler bracket 12 is rotated simultaneously.

That is, when the spoiler 10 is drawn out, the first link member 320 and the second link member 340 determine drawing out angle of the spoiler and the third link member 360 determines the drawing out height thereof. As described above, the first, second and third link members share roles to control the drawing out angel and height of the spoiler 10 when it is drawing out so that it can be designed stably for drawing out operation of the spoiler 10.

The first link member 320, the second link member 340 and the third link member 360 of the linkage 300 may be provided as a pair symmetrical to both sides of the base bracket 200 and the spoiler bracket 12.

As described above, the first link member 320, the second link member 340 and the third link member 360 consisting the linkage 300 are arranged symmetrically to both sides of the base bracket 200 and the spoiler bracket 12 so that external force applied to the spoiler 10 is to be diffused thereby to decrease thickness and lower rigidity of the respective link member and thus it is efficient to package the spoiler.

Meanwhile, a fixing protrusion 366 may be formed on the third link member 360, which contacts the second link member 340 and defines the rotation of the third link member 360 when the spoiler 10 is drawn out fully.

As described above, the fixing protrusion 366 is formed on the third link member 360 and thus excessive drawing out of the spoiler 10 is limited. Especially, the state of the spoiler 10 being drawn out fully is a case where a vehicle drives at a high speed, and in this case the air load applied on the spoiler 10 becomes great wherein the second link member 340 contacts the fixing protrusion 366 formed on the third link member 360 and supported thereon, thereby ensuring force to support the air load.

Meanwhile, in a state where the spoiler 10 is drawn out fully, the other end 364 of the third link member 360 connected to the second link member 340 is disposed to be higher than one end 342 of the second link member 340 connected to the first link member 320.

That is, a length of the third link member 360 is longer than those of the first link member 320 and the second link member 340 such that the other end 364 of the third link member 360 is disposed to be highest when the spoiler 10 is drawn out fully, thereby maintaining the drawing out angle of the spoiler 10 proper for a high speed driving. Furthermore, various drawing out angles can be set when the spoiler 10 is drawn out.

Further, the third link member 360 may be formed almost right angle to the base bracket 200 when the spoiler 10 is drawn out fully.

As described above, the third link member 360 is maintained almost vertically between the base bracket 200 and the spoiler bracket 12 when the spoiler 10 is drawn out fully thereby to ensure sufficiently support force of the third link member.

Meanwhile, the linkage 300 may formed such that the base bracket 200, the first link member 320, the second link member 340 and the third link member 360 are connected to be unfolded to form a trapezoid or quadrangle when the spoiler 10 is drawn out fully.

As described above, the base bracket 200, the first link member 320, the second link member 340 and the third link member 360 form a trapezoid or quadrangle when the spoiler 10 is drawn out fully and thus the load input through the spoiler 10 can be supported stably.

Figure 6:
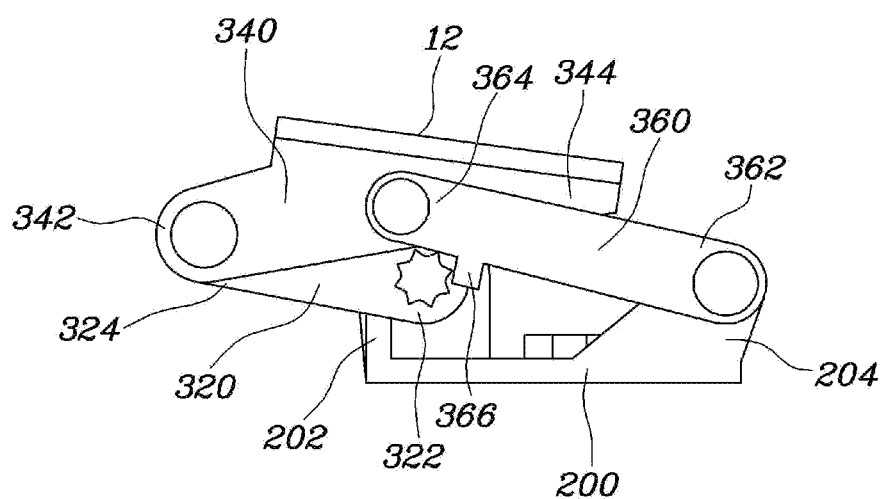
FIG. 6, FIG. 7 and FIG. 8 are views illustrating an operation state of the linkage of the variable spoiler apparatus for a vehicle as shown in FIG. 1.
Figure 7:
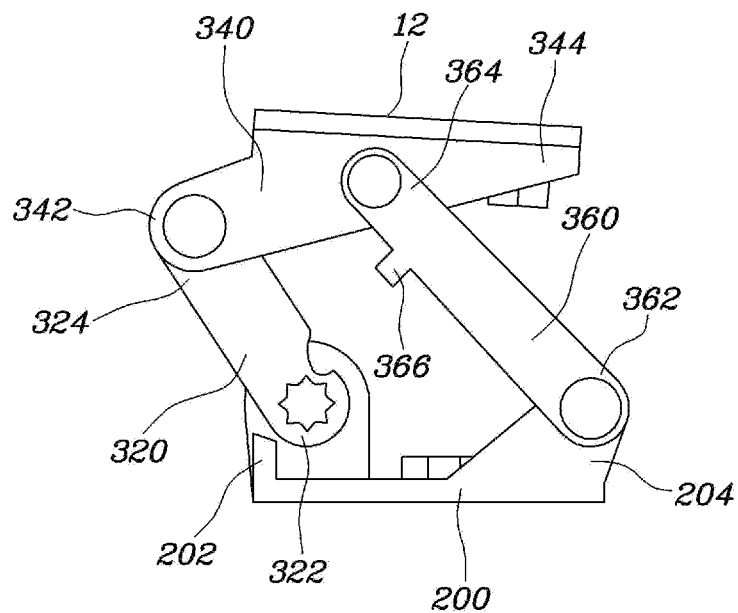
Figure 8:
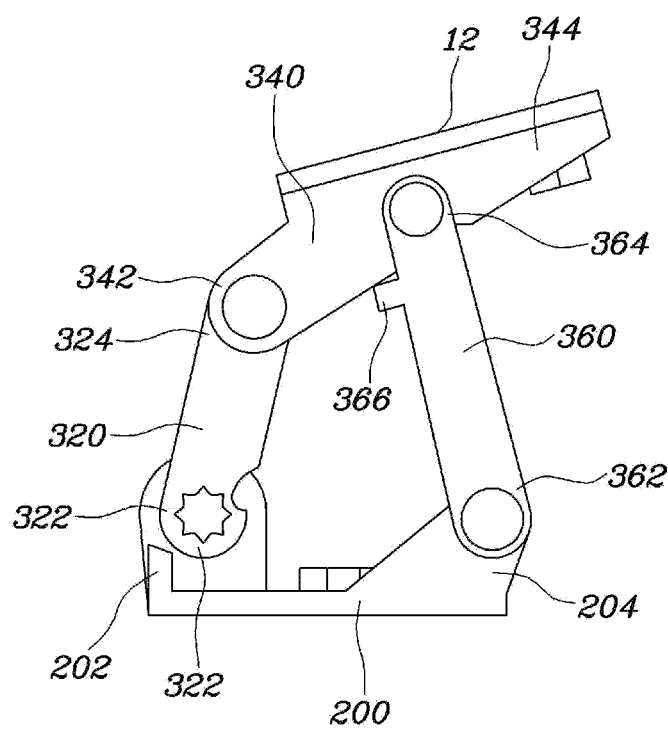

FIGS. 6 to 8 show operation states of the linkage 300 of the variable spoiler apparatus for a vehicle wherein the operational force of the driving motor 140 is transferred to the driving shaft 160 when the driving motor 140 of the driving portion 100 operates, and the first link member 320 is rotated according to the rotation of the driving shaft 160. At this time, the second link member 340 is rotated together with the first link member 320 to vary the drawing out angle of the spoiler 10 and the third link member 360 connected to the second link member 340 is rotated together with the second link member 340 to vary the drawing out height of the spoiler 10.

As described above, the operational force transferred through the driving portion 100 is transferred to the linkage 300 thereby to perform drawing out or stowing operation of the spoiler 10 while the drawing out angle and height of the spoiler 10 are varied.

Especially, according to an exemplary embodiment of the present invention the location of the spoiler 10 is to not be varied by air load even at various drawing out angles and heights of the spoiler 10 as shown in FIGS. 6 to 8 using the reduction ratio set according to engaged-connection of the worm gear 144 and the gear set 120 of the driving portion 100.

According to the variable spoiler apparatus for a vehicle configured as described above, the angle and height of the spoiler 10 can be controlled variously and further the corresponding location of the spoiler 10 can be fixed to the various angles and heights without using power from a motor.

Further, according to the variable spoiler apparatus for a vehicle torque and external force required for stowing or drawing out the spoiler 10 are diffused into the four joint link structure so that the thickness and rigidity of the linkage for supporting the spoiler 10 are lowered, thereby inducing system stability and package reduce.

Furthermore, the variable spoiler apparatus for a vehicle is constructed with strong four joint link structure so that the damage to the components of the spoiler apparatus can be prevented and fuel efficiency and driving stability are improved even in case where the spoiler is applied.

According to the variable spoiler apparatus for a vehicle configured as described above, the angle and height of the spoiler can be controlled variously and the location where the spoiler is disposed at a specific angle and height can be fixed without using power from a separate motor.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable spoiler apparatus for a vehicle, comprising:
    a driving portion including a gear set configured to provide a predetermined speed reduction ratio, wherein a driving motor and a driving shaft for supplying rotational force of the driving motor are connected to the gear set; and
    a linkage,
    wherein a base bracket to which the driving shaft of the driving portion is connected is provided on the linkage,
    wherein the linkage includes a plurality of links that are connected to a spoiler bracket connected to the driving shaft, the base bracket and a spoiler, and
    wherein the plurality of links are rotated together with the driving shaft when the driving motor of the driving portion operates thereby to draw out or stow the spoiler,
    wherein the linkage comprises:
        a first link member, one end of which is connected integrally to a front end of the base bracket through the driving shaft and which is rotated together with the driving shaft:
        a second link member, one end of which is connected rotatably to another end of the first link member and another end of which is connected to the spoiler bracket; and
        a third link member, one end of which is connected rotatably to a rear end of the base bracket and another end of which is connected rotatably to the second link member.

2. The variable spoiler apparatus for the vehicle of claim 1,
    wherein a worm gear is formed on a motor shaft on the driving motor of the driving portion and the gear set is provided with a plurality of gear members having different sizes that are connected each other, and
    wherein one gear member is engaged with the worm gear and another gear member is connected to the driving shaft.

3. The variable spoiler apparatus for the vehicle of claim 2, wherein the gear set of the driving portion comprises:
   a gear housing;
   an input gear member that is arranged rotatably in the gear housing and is engaged with a worm gear;
   a middle gear member that is engaged with the input gear member to be rotated in an opposing direction of the input gear member ; and
   an output gear member which is engaged with the middle gear member and to a center of which the driving shaft is connected integrally.

4. The variable spoiler apparatus for the vehicle of claim 3, wherein the input gear member, the middle gear member and the output gear member of the gear set have different gear ratios respectively to set reduction ratio and respective gear ratio is set to support load applied to the spoiler.

5. The variable spoiler apparatus for the vehicle of claim 3, wherein the motor shaft of the driving motor is extended front/rearward to rotate front/rearward the gear member of the gear set that is engaged with the worm gear.

6. The variable spoiler apparatus for the vehicle of claim 1, wherein the first link member, the second link member and the third link member of the linkage are provided as a pair symmetrical to both sides of the base bracket and the spoiler bracket.

7. The variable spoiler apparatus for the vehicle of claim 1, wherein a fixing protrusion is formed on the third link member, which contacts the second link member and defines a rotation of the third link member when the spoiler is drawn out fully.

8. The variable spoiler apparatus for the vehicle of claim 1, wherein in a state where the spoiler is drawn out fully, the another end of the third link member connected to the second link member is disposed to be higher than the one end of the second link member connected to the first link member.

9. The variable spoiler apparatus for the vehicle of claim 1, wherein the third link member is formed to be maintained approximately at right angle to the base bracket when the spoiler is drawn out fully.

10. The variable spoiler apparatus for the vehicle of claim 1, wherein the linkage is formed such that the base bracket, the first link member, the second link member and the third link member are connected to be unfolded to form a trapezoid or quadrangle when the spoiler is drawn out fully.

* * * * *